March 24, 1953  H. W. RONFELDT  2,632,478
THREAD PROTECTOR
Filed July 1, 1948
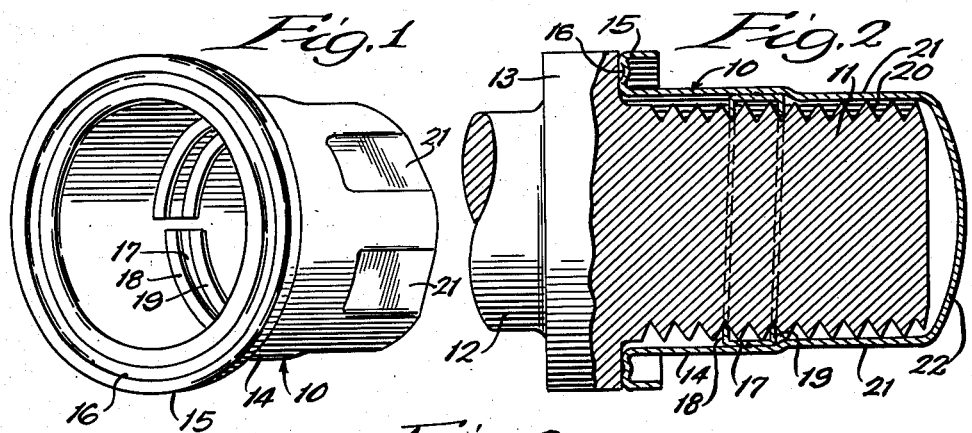
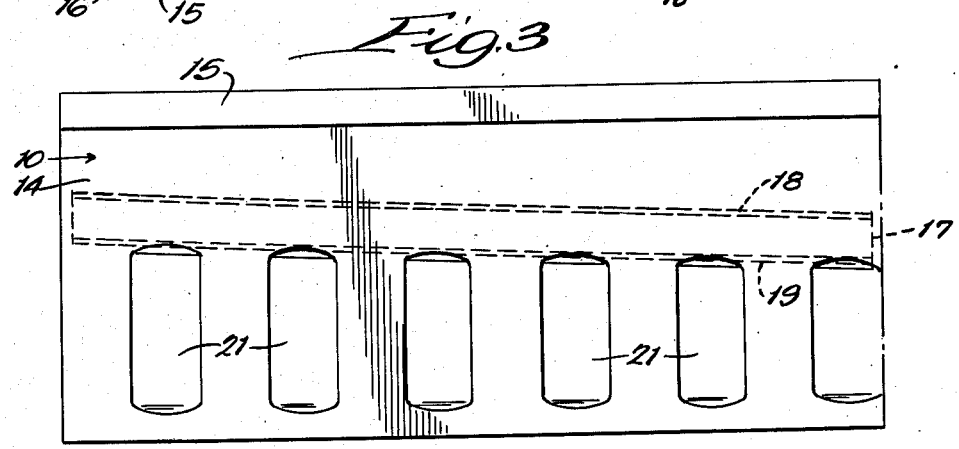
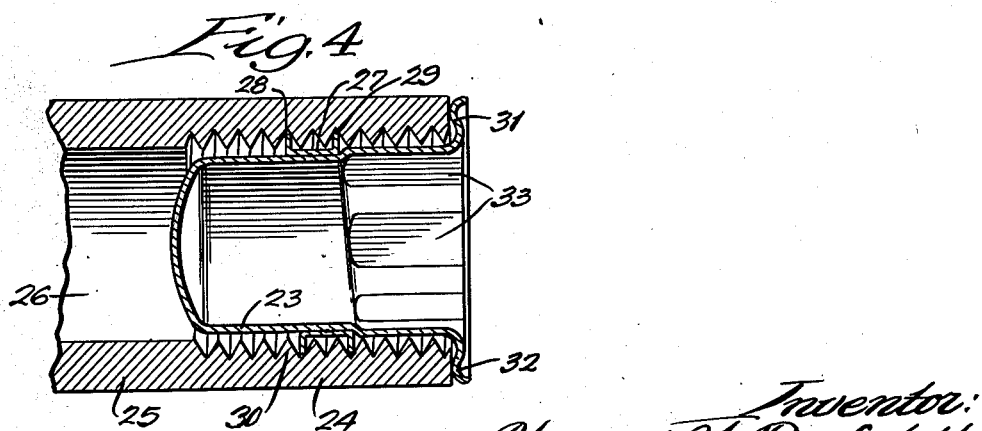
Inventor:
Howard W. Ronfeldt,
By Dawson, Ooms, Booth and Spangenberg,
Attorneys.

Patented Mar. 24, 1953

2,632,478

UNITED STATES PATENT OFFICE 2,632,478

THREAD PROTECTOR

Howard W. Ronfeldt, Toledo, Ohio

Application July 1, 1948, Serial No. 36,515

2 Claims. (Cl. 138—96)

My invention relates to improvements in thread protectors adapted for use in cooperation with threaded ends of pipes, shafts, rods and the like to prevent injury as an incident to forces and elements normally encountered prior to installation or use.

Since such thread protectors are ordinarily discarded when removed from the installed position on a pipe or rod, consideration must be given to the construction of the element from a cost standpoint. As far as I am aware, I am the first to provide a thread protector that offers protection to the threaded parts against corrosive attack by elements with which it may be associated; that protects the threaded parts against injury from impact or abrasion; that provides a gripping relation when installed which is of the same magnitude when disassembled at the station of use as when first installed and requires substantially the same torque to remove the protector after extended use as when first applied; that is adapted for the protection of female threaded parts as well as male parts, and that cooperates with an actuator to effect turning movement toward or away from the installed position. I am able to combine all of these characteristics into a unitary structure which is easily and economically produced of low cost materials.

It is an object of this invention to produce a thread protector having the characteristics described above in that it is easily manufactured, of low cost and relatively thin gauge materials; protects the threaded parts from corrosion by elements in the atmosphere; protects the threaded parts from injury by impact or abrasion; forms a relatively tight grip in the installed relation which grip remains rather constant throughout the period of use; may be designed for use with female as well as male threaded parts; has characteristics which cooperate with actuating means by which the protector is turned toward or away from the installed relation, and which assists in the assembly of the protector as will hereinafter be pointed out; and has thread engaging members corresponding in contour to the pitch of the threads on the part to be protected to facilitate installation and provide a resilient connection in the installed relation.

These and other objects and advantages of this invention will hereinafter appear, and for purposes of illustration but not of limitation embodiments of the invention are shown in the accompanying drawing in which Fig. 1 is a perspective view of a thread protector embodying features of my invention.

Fig. 2 is a sectional view of the thread protector shown in Fig. 1 in the installed position on the end of a male threaded pipe.

Fig. 3 is a developed view of the protector to show the external contour of the protector wall.

Fig. 4 is a sectional elevational view of a modified form of thread protector embodying the features of my invention and adapted for use with a female threaded part.

As shown in Figs. 1 and 2, the cardinal features of my invention are separately and collectively embodied in a thread protector 10 adapted for use with a male threaded end portion 11 of a pipe 12 having an annular shoulder 13 in the region of the base of the threaded portion 11.

The protector 10 is illustrated as being formed of two relatively rigid parts, one of which is a cup shaped member 14 which may be formed of such materials as sheet metal, plastics or resinous treated fabrics by the usual forming methods such as molding, stamping and the like. Integral with the inner end portion of the cup shaped member 14 is an annular rim or apron 15 that may be formed with an annular rib or embossure 16. The forwardly extending portion is adapted to engage the annular shoulder 13 before the cup shaped portion has completely covered the threaded portion of the pipe. At the final stages of installation, the forces developed between the cooperating shoulder 13 and the embossure 16 causes the apron to be flexed in a manner to establish a rather permanent sealing relation, thereby completely to enclose the threaded portion 11 and seal the same from the elements of the atmosphere or from elements with which the threaded portion might otherwise come in contact. Instead of providing an embossure 16 in the rim 15, a corresponding effect may be secured by inclining the apron in the direction whereby the outer end is engaged all around by the abutment 13 just before the cup shaped member has been turned to its installed position.

A grooved or channel shaped sector 17 is secured to an intermediate portion along the inner wall of the cup shaped member 14. The sector 17 may comprise a complete convolution or it may comprise a portion thereof. It may be formed by a stamping operation of relatively rigid resilient sheet stock, it may be molded, or it may be rolled into spirally shaped convolutions from an endless strip of sheet material, and the convolutions may be cut in a manner to provide the desired sectors. The channel shaped member corresponds dimensionally to the inner diameter of the cup shaped member to which it is fixed by the usual joining processes such as welding, riveting, adhering, spot-welding or the like. The sector 17 is spirally arranged to correspond to the pitch of the threads of the threaded portion 11 of the part to be protected, and the resilient inturned edges 18 and 19 therefore are adapted threadably to engage the pipe threads 20. The upturned edges may be formed in such spaced relation that they engage the same thread therebetween or enable two or more threads to be disposed therebetween. I have found it expedient to have a spaced relation between the uprights 18 and 19 to enclose two or more threads. The resilient uprights 18 and 19 serve to actuate the cup shaped member longitudinally along the pipe 12, responsive to turning movement of the cup shaped member in one direction or the other.

Certain new and improved benefits are derived from the use of a channel shaped sector of the type described as the thread engaging member. In the installed relation the longitudinal forces imparted upon engagement of the rim 15 with the wall 13 are effective to tension the grip between the uprights 18 and 19 and the threads 20 whereby a gripping relation is established which prevents inadvertent movement of the protector 10 from the installed relation. The uprights 18 and 19 may be arranged tensionally to grip the threads therebetween to establish a desirable gripping relation even though no abutment is provided for engagement with the rim 15 or when, instead of a cup shaped member 14, a simple sleevelike unit is used to cover and protect the threads 20.

Because of this interrelationship to provide a tensioned grip when in the installed relation, I have found that the protector remains in the installed relation for an extended period of time notwithstanding the various types of forces which might be encountered in normal handling. I have found that the forces necessary to remove the protector do not vary appreciably even after long use from the forces required when the protector was first installed.

To facilitate movement of the protector 14, toward or away from the installed relation, I provide a series of equi-distantly spaced flattened surfaces 21 to the end wall portion of the cup shaped member 14. This provides a better grip in the event that the protector is actuated manually, or it provides a seat for actuating tools that might conceivably be used for such units.

I secure an additional advantage from the flattened surfaces 21 in that the inner ends thereof may be selectively spaced, as shown by the developed view in Fig. 3, to provide a seat for the channel shaped member 17 when originally inserted during assembly. Thus the channel shaped member almost automatically assumes its desired position upon insertion, and it is only necessary thereafter to fix it in place by ordinary securing means. This eliminates the very tedious and time-consuming task of holding this relatively small and light part in the desired position during assembly, the prior art having used jigs for this purpose to insure that the parts will be correctly positioned. Some advantage may be derived by securing the parts 17 and 14 together by attaching at their ends, leaving the intermediate portion thereof to adjust itself for cooperation with the threads 20 to the extent that greater adaptability and usefulness is secured.

In operation, the protector 10 is merely positioned over the end to be protected until the resilient uprights 18 and 19 engage the threads 20 of the portion 11. Then the protector is turned in a direction to secure the protector on to the pipe 12 until full engagement is established between the embossure 16 and the shoulder 13. Sufficient force generally is applied to flex the rim 15 which establishes a sealing relation and transmits forces to the uprights 18 and 19 whereby they tensionally grip the threads 20 in the installed relation. By this organization of parts the protector 10 completely houses the threaded end portion 11 of the pipe 12 in sealing relation and a tensioned grip is established which insures that the protector will remain in the desired relation for the desired length of time.

In the event that it is unnecessary to seal off the threaded end portion of the pipe, the shoulder 13 and the rim 15 may be dispensed with and the desired tension may be developed upon an engagement of the end of the pipe 12 with the base 22 of the cup shaped member.

Fig. 4 illustrates a protector 23 embodying the various features of my invention, but adapted for use with a threaded female end portion 24 of a pipe 25. In this event, the cup shaped portion is dimensioned to fit within the bore 26 of the pipe, and the channel shaped sector 27 is dimensioned to seat about the outer wall of the cup shaped member 23. The channel shaped sector 27 is secured to an intermediate portion of the cup shaped member 23 by the usual securing means in a manner to enable the resilient uprights 28 and 29 to extend outwardly and threadably engage the threads 30. When the uprights 28 and 29 are arranged by themselves tensionally to grip the thread members 30, a sleeve member may be used instead of a cup shaped member, especially when it is not necessary to protect the threaded end portion from attack by atmospheric elements.

The same type of apron or rim 31 may be provided on the open end portion of the cup shaped member 23. The rim may be inwardly inclined resiliently to engage the end wall of the pipe 25 in the assembled relation or an embossure 32 may be provided to engage the end wall in a manner previously described in connection with the element described in Figs. 1 and 2.

Flattened sections 33 may also be provided about the wall of the cup shaped member 23 to receive a suitably actuating tool, and the embossed portion existing on the outer wall of the cup shaped member may be arranged in such spaced relation as will provide an acceptable seat for the sector 27 during assembly.

It will be apparent from the description that I have provided a new and improved thread protector which is adapted for use with male and female threaded parts and which may be adapted also to establish a sealing relation which prevents corrosive attack of the threaded part by outside elements. By the arrangement of sectors and other cooperating parts a gripping relation may also be established during installation and in final installation which militates against the inadvertent movement of the thread protector and which insures that a sealing relation is maintained. The gripping relation and the sealing relation combine to impart the desirable feature whereby the grip of the protector is not eliminated or greatly amplified to render its assembly or removal more difficult.

It will be understood that numerous changes may be made in the details of construction, arrangement and operation without departing from the spirit of the invention especially as defined in the following claims.

I claim:

1. A thread protector comprising a pair of stamped metal parts secured one to the other, one part being a cup-shaped member which substantially covers the threaded portion of the part to be protected and has an annular flange extending substantially perpendicularly from the periphery of the cup-shaped member, an annular embosser in the flange member for flexing the flange upon reaction with a cooperating wall on the part to be protected upon actuation to the installed relation thereby to establish a sealing relation therebetween, the other part being a spirally shaped groove sector having a pair of spaced up-turned flanges the free edges of which correspond to the pitch of the threads of the parts to be protected which they engage and co-operate with the embossed flange to establishing the sealing relation when installed, the embossed areas are equidistantly arranged in the wall of the cup-shaped member with inner ends of successive embossed areas terminating in spaced relation to provide an internal abutment corresponding to the spiral taper of the grooved sector thereby to function as a seat for the sector in establishing the assembling relation.

2. A thread protector comprising a pair of stamped metal parts secured one to the other, one part being a cup-shaped member which substantially covers the threaded portion of the part to be protected and has an annular flange extending substantially perpendicularly from the periphery of the cup-shaped member, an annular embosser in the flange in spaced relation from the cup-shaped member for flexing the flange upon reaction with a cooperating wall on the part to be protected upon actuation to the installed relation thereby to establish a sealing relation therebetween, the other part being a spirally shaped groove sector having a pair of spaced up-turned flanges the free edges of which correspond to the pitch of the threads of the part to be protected which they engage and co-operating with the embossed flange to establish the sealing relation when installed, the grooved sector is secured to the cup-shaped member at its extreme ends leaving the intermediate portions free for adjustment in accordance with the contour of the threads of the parts to be protected.

HOWARD W. RONFELDT.

REFERENCES CITED

The following references are of record in the file of this patent:

UNITED STATES PATENTS

| Number | Name | Date |
| --- | --- | --- |
| 509,115 | Blakey | Nov. 21, 1893 |
| 966,610 | Shrum | Aug. 9, 1910 |
| 1,302,441 | Schweinert et al. | Apr. 29, 1919 |
| 1,421,420 | Dery | July 4, 1922 |
| 1,584,313 | Mallory | May 11, 1926 |
| 1,771,522 | Berge | July 29, 1930 |
| 1,776,528 | Unke | Sept. 23, 1930 |
| 1,885,375 | Ponce | Nov. 1, 1932 |
| 1,961,121 | Knapp | May 29, 1934 |
| 2,055,646 | Bosley | Sept. 29, 1936 |
| 2,204,130 | Engstrom | June 11, 1940 |

FOREIGN PATENTS

| Number | Country | Date |
| --- | --- | --- |
| 232,941 | Great Britain | Aug. 6, 1925 |